Feb. 13, 1934. F. D. HARDESTY Re. 19,073
LOCKING DEVICE
Original Filed Sept. 21, 1925
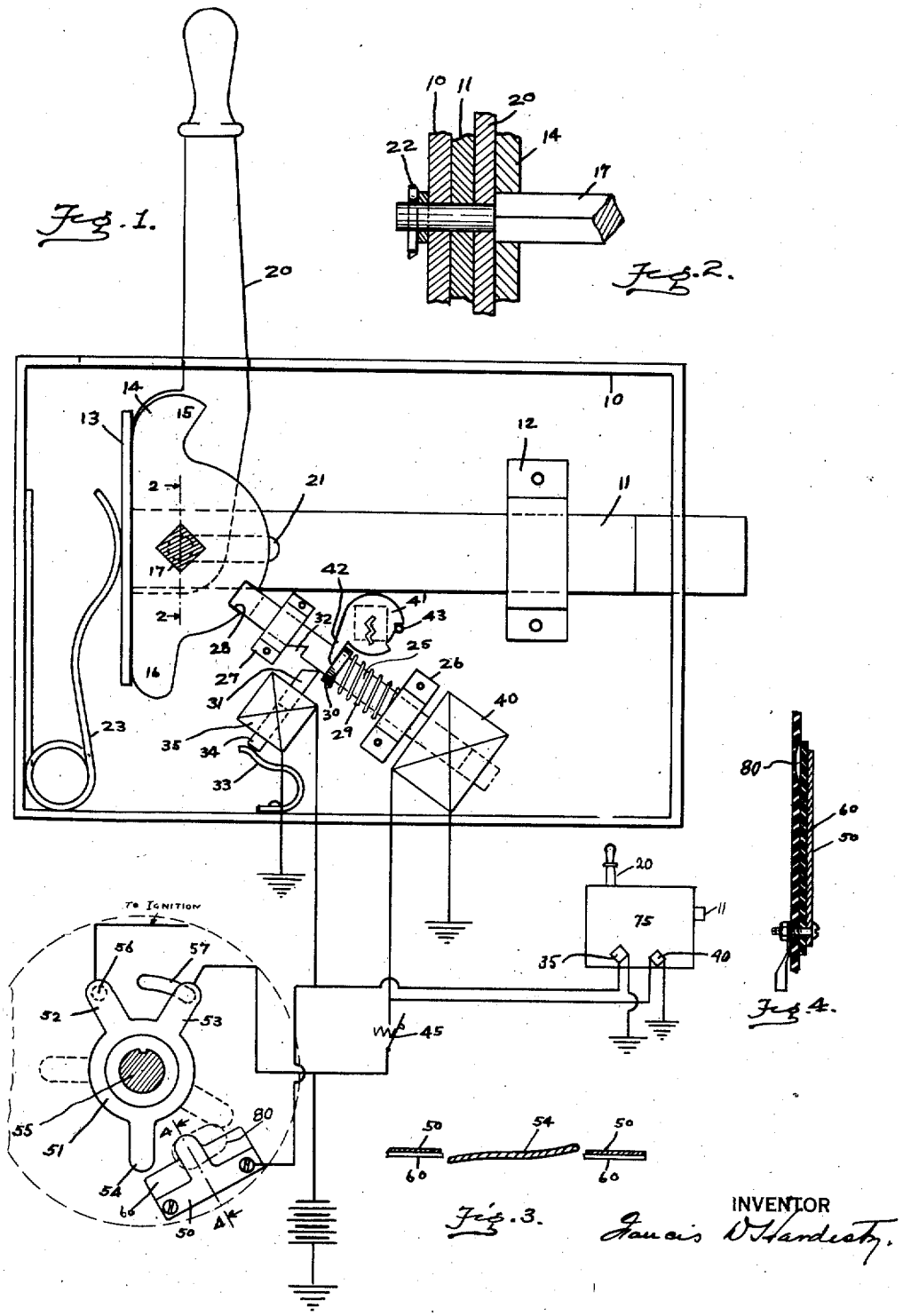
INVENTOR
Francis D. Hardesty.

Reissued Feb. 13, 1934

Re. 19,073

UNITED STATES PATENT OFFICE 19,073

LOCKING DEVICE

Francis D. Hardesty, Ferndale, Mich., assignor, by mesne assignments, to Ternstedt Manufacturing Company, Detroit, Mich., a corporation of Michigan Original No. 1,833,572, dated November 24, 1931, Serial No. 57,546, September 21, 1925. Application for reissue July 5, 1932. Serial No. 620,954

20 Claims. (Cl. 70—50)

The present invention relates to locks for vehicles and particularly to locks for movable parts thereof such as the doors of a closed vehicle such as a "sedan" type of automobile.

Heretofore, on such vehicles, in order to lock the doors thereof, it has been necessary to voluntarily lock each door. This is usually done by operating a button or lever on the inner side of the doors except one of them which is then locked by means of a key.

The present invention has among its objects the elimination of this method of locking by providing an automobile locking system so that all or a plurality of the doors may be locked simultaneously. Further, if desired, this locking may take place automatically as, for instance, on the turning of the ignition switch.

A further object is to so lock the doors that while access to the interior is impossible, free egress is allowed.

A still further object is to provide means for simultaneously unlocking all of the doors from the interior of the vehicle.

Another object is the means by which the preceding objects are accomplished.

In the drawing the invention is illustrated as applied to a door lock, for example, for a door of a closed automobile, and the drawing shows in Fig. 1 two door locks with the controls therefor; in Fig. 2 a section through line 2—2 of Fig. 1; Fig. 3 is an enlarged diagrammatic view of contacts 50, 54 in which the contact 50 is illustrated twice, once to the right of the contact 54 showing the relative position of these contacts as the ignition is being turned off and the circuit through solenoid 35 temporarily completed, and once to the left of the contact 54 showing the relative position of these contacts as the ignition is being turned on; and Fig. 4 is an enlarged section on line 4—4 of Fig. 1.

As shown, the device consists of a lock having a casing 10 in which slides a bolt 11 carried in suitable guides, one of which is shown at 12. At the rear end of the bolt 11 is a cross piece or abutment 13 against which is adapted to act a double cam piece 14. This cam piece has the two cam ends 15 and 16 so that it may be rotated either way and will operate the bolt and, further, is mounted on a square shaft 17 which extends through the cover for casing 10 and will be the shaft for a handle on the outside of the door (the cover, handle, and door not being shown).

The inner end of shaft 17 will be round as shown clearly in Fig. 2 and will serve as a bearing for the lower end of lever 20. The latter will have near its lower end on one edge a cam surface of a contour similar to or the same as that on cam 15 and will extend up to the upper edge of the door body so that bolt 11 may be operated by either the handle mentioned or the lever independently of the other. The round end of shaft 17 will also extend through a slot 21 in bolt 11, the shaft acting both as a guide and stop for the bolt, and will pass through the casing 10 and be secured in any suitable manner as by cotter pin 22. A suitable spring 23 will be used to return the bolt.

In addition to the parts mentioned, a second bolt or dog 25 will also be mounted in casing 10 in suitable guides 26 and 27 and this bolt is adapted to enter a slot 28 in the edge of cam piece 14 and prevent turning of the latter. Bolt or dog 25 will be impelled toward the slot 28 by a light spring 29 between guide 26 and a collar 30 carried by the bolt, and will be retained out of the slot by a latch 31 co-operating with a notch 32 in the bolt 25 when the latter is sufficiently retracted. This latch 31 will be pressed into the notch by spring 33 acting against a plunger 34 which in turn acts against latch 31. Latch 31 and plunger 34 will be guided in and the former will act as the core of a solenoid 35. Latch 31 will be of magnetic material while the plunger 34 will be of non-magnetic material.

Further, there will be another solenoid 40 surrounding the rear end of bolt or dog 25 so located as to retract the bolt from engagement with slot 28 and a sufficient distance to permit engagement of latch 31 in notch 32.

In addition there will be provided in one of the locks a key operated barrel 41 carrying a finger 42 acting on collar 30 to retract bolt 25 a sufficient distance to disengage slot 28, but being prevented by a stop 43 from retracting the bolt far enough to cause latch 31 to engage notch 32.

As indicated, solenoids 35 and 40 will be connected to the electric system of the vehicle, the former through any suitable switch as, for instance, a special ignition switch and the latter may be for example, through a separate switch 45 located at any suitable place on the vehicle, for example, a simple spring button switch on the instrument board.

Solenoid 35 will be connected to ground at one side and to a contact piece 50 in the ignition switch on the other. Contact piece 50 and the other elements of the switch will be so constructed and arranged that the circuit through solenoid 35 will be closed only during the operation of turning off the ignition. This may be done by the means indicated in the drawing.

In a common type of ignition switch a disc 51 carrying three integral fingers 52, 53 and 54 is keyed or splined to a shaft 55 forming part of the operating lever (not shown). When this disc 51 is in the position shown in full lines, the fingers 52 and 53 are in contact with two contacts 56 and 57 connected respectively to the ignition circuit and the battery, while the finger 54 acts merely to balance the pressure of the other two. In the dotted position, finger 53 is in contact with contact 56 but the other two are not making contacts and the circuit is accordingly broken.

For the present purpose contact 57 is extended laterally so that finger 53 maintains contact therewith after finger 52 has left contact 56, and contact 50 is arranged to co-act with finger 54 when the disc is moving in a counter-clockwise direction and before finger 53 has left contact 57. This may be accomplished by forming finger 54 with one edge turned up and the other down as indicated in Fig. 3 so that in turning "off" the ignition finger 54 passes over contact 50 and in turning "on" it passes under the thin piece of insulating material 60 upon which contact 50 is mounted, the numeral 80 indicating a depression below the insulating piece 60 permitting the action just described.

While the device has been described with reference to a single lock it is obvious that it may be applied to several locks on the same vehicle and this is contemplated. In fact, a second lock is indicated at 75 similar in all respects to the other except that it has no key operated part. A key operated part need be used on but one of the locks on a vehicle because when one door has been opened, switch 45 is accessible to unlock all of the doors simultaneously.

Further, in the form shown the locks will all, including the key operated one, remain in locking condition until the switch 45 is closed so that, if the operator desires for any reason to open with his key the one door, as soon as he removes the key the dog 25 again locks the rollback or cam 14, unless in the meantime he has closed switch 45.

Also, the present device may be used in conjunction with the locking device for a control member described and claimed in Patent No. 1,805,088, issued May 12, 1931, by the applicant and such use is in contemplation. If this is done, the mere voluntary stopping of the engine by turning off the ignition will lock the particular control member and all of the doors instantaneously so that it will be impossible for the operator to leave without securing the car against unauthorized use.

While the invention has been described as applied to door locks, it is not to be considered as limited to this use. It may be applied with minor modification to any movable part, such as the hood, a spare tire lock, tool box, and so forth, any or all of which may be aranged to be locked when the ignition is cut off. It will also be apparent that the switch that controls the solenoids 35 need not at the same time control the ignition, but I regard the control of the locks by the ignition as desirable under some circumstances.

Having now described the invention and the preferred form of embodiment thereof, it is to be understood that it is not to be limited to the specific details herein described and illustrated but only by the scope of the claims which follow:

I claim:

1. A lock for a door of an automobile provided with an engine having electric ignition, said lock comprising a spring actuated bolt, means extending to the exterior of the door for operating said bolt and other means for automatically locking said first means upon voluntary stopping of the engine of said automobile by turning off said ignition.

2. A lock for a door of an automobile comprising a spring actuated bolt, operating means extending to the exterior of the door for operating said bolt, a handle accessible to the interior of said door, and control means for automatically locking said operating means upon voluntary stopping of the engine of said automobile, said control means being free of the handle so as to operate without affecting the operation of said handle.

3. A lock for a door of an automobile comprising a spring bolt, a pair of members for actuating said bolt, one of the members being adapted to be operated from the exterior and the other from the interior of said door, and electrically actuated means operated by the ignition switch of the automobile for locking the first of said members.

4. A lock for a door of an automobile having a motor provided with electric ignition and a switch for controlling the same, said lock including a bolt, manually operable means for actuating the bolt, a second bolt adapted to lock said means, a latch adapted to maintain said second bolt in inoperative position to permit free operation of said manually operable means, electromagnetic means for releasing said latch, and means on said switch for energizing the electromagnetic means when the ignition circuit is broken.

5. In an automobile, a motor having electric ignition and a switch for controlling the same and a door lock including a bolt, means for operating the bolt, a locking device for said means, electromagnetic means for retracting said locking device, mechanical means for retaining said device in unlocked position, and electromagnetic means for releasing said mechanical means, the releasing means being energized during the operation of breaking the ignition circuit and the retracting means being adapted to be energized by a separate switch.

6. In an automotive vehicle an electric switch having a control lever adapted to rest in a "running" position and in an "off" position, an electrically operated lock for a movable part of said vehicle, an electric circuit including said lock and said switch, and a circuit closer in said switch adapted to close said circuit momentarily when said lever is moved from the "running" position to the "off" position, but leave said circuit open when moved from the latter to the former position.

7. A locking system for an automotive vehicle having a plurality of doors comprising a lock for each of said doors, each lock having a retractable bolt and inside and outside retractors independently operable to retract said bolt, a dog for each of the outside retractors, and means controllable at a remote location upon the automotive vehicle body for simultaneously throwing a plurality of said dogs into dogging relation with the outside retractors.

8. A locking system for an automotive vehicle having a plurality of doors comprising a lock for each of said doors, each lock having a casing, a retractable bolt and inside and outside retractors independently operable to retract said bolt, a dog carried by each of the said casings for the outside retractor, and means including electro-magnetic means controllable at a remote location within the automotive vehicle body for simultaneously throwing a plurality of said dogs into dogging relation with the said outside retractors and for releasing the dogs from dogging relation with the outside retractors.

9. A locking system for an automotive vehicle having a plurality of doors comprising a lock for each of said doors, each lock having a retractable bolt and inside and outside retractors independently operable to retract said bolt, a dog for each of the outside retractors, and means controllable at a remote location within the automotive vehicle body for simultaneously throwing a plurality of said dogs into dogging relation with the said outside retractors, and mechanical means cooperating with one of said locks for releasing the dog from the outside retractor of said lock.

10. A locking system for an automotive vehicle having a plurality of doors comprising a lock for each of said doors, each lock having a retractable bolt and inside and outside retractors independently operable to retract said bolt, a dog for each of the outside retractors, and means including electromagnetic means operable from a remote location within the automotive vehicle body for simultaneously throwing a plurality of said dogs into dogging relation with the said outside retractors, and mechanical means cooperating with the dog of one of said locks for releasing the dog from the outside retractor of said lock.

11. A locking system for an automotive vehicle having a plurality of doors comprising a lock for each of said doors, each lock having a retractable bolt and inside and outside retractors independently operable to retract said bolt, a dog for each of the outside retractors, and means including electromagnetic means operable from a remote location within the automotive vehicle body for simultaneously throwing a plurality of said dogs into dogging relation with the said outside retractors, and key controlled means cooperating with one of said locks operable from the outside of the vehicle for releasing the dog from the retractor of this lock.

12. A locking system for an automotive vehicle having a plurality of doors comprising a lock for each of said doors, each lock having a retractable bolt and inside and outside retractors independently operable to retract said bolt, a dog for each of the outside retractors, and means controllable at a remote location within the automotive vehicle body for simultaneously throwing a plurality of dogs into dogging relation with the said outside retractors and for simultaneously releasing a plurality of dogs from dogging relation with the outside retractors, and mechanical means cooperating with one of said locks for separately releasing the dog from the outside retractor of this lock.

13. A locking system for an automotive vehicle having a plurality of doors comprising a lock for each of said doors, each lock having a retractable bolt and inside and outside retractors independently operable to retract said bolt, a dog for each of the outside retractors and means including electromagnetic means controllable at a remote location within the automotive vehicle body for simultaneously throwing a plurality of said dogs into dogging relation with the said outside retractors and for simultaneously releasing a plurality of said dogs from dogging relation with the outside retractors, and mechanical means cooperating with the dog of one of said locks for separately releasing the dog from the retractor of this lock.

14. A locking system for an automotive vehicle having a plurality of doors comprising a lock for each of said doors, each lock having a retractable bolt and inside and outside retractors independently operable to retract said bolt, a dog for each of the outside retractors, and means including electromagnetic means controllable at a remote location within the automotive vehicle body for simultaneously throwing a plurality of said dogs into dogging relation with the outside retractors and for simultaneously releasing a plurality of said dogs from dogging relation with the outside retractors, and key controlled means operable from the outside of the vehicle cooperating with the dog of one lock for separately releasing the dog from the retractor of this lock.

15. A locking system for an automotive vehicle having a plurality of doors comprising a lock for each of said doors, each lock having a retractable bolt and inside and outside retractors independently operable to retract said bolt, and means controllable at a remote location upon the vehicle body for simultaneously rendering a plurality of the outside retractors ineffective to retract their respective bolts.

16. A locking system for an automotive vehicle having a plurality of doors comprising a lock for each of said doors, each lock having a retractable bolt and inside and outside retractors independently operable to retract said bolt, a shiftable member for each outside retractor for rendering the outside retractor ineffective to retract the bolt, and means including electromagnetic means controllable at a remote location upon the automotive vehicle body for simultaneously shifting a plurality of said shiftable members to render a plurality of said outside retractors ineffective to retract their respective bolts.

17. A locking system for an automotive vehicle having a plurality of doors comprising a lock for each of said doors, each lock having a retractable bolt and inside and outside retractors independently operable to retract said bolt, and means controllable at a remote location upon the vehicle body for simultaneously rendering a plurality of the outside retractors ineffective to retract their respective bolts, a second means cooperating with one of the outside retractors of one of said locks operable from the outside of the vehicle to render the outside retractor of this lock effective to retract the bolt.

18. A locking system for an automotive vehicle having a plurality of doors comprising a lock for each of said doors, each lock having a retractable bolt and inside and outside retractors independently operable to retract said bolt, a shiftable member for each outside retractor for rendering the outside retractor ineffective to retract the bolt, and means including electromagnetic means controllable at a remote location upon the automotive vehicle body for simultaneously shifting a plurality of said shiftable members to render a plurality of said outside retractors ineffective to retract their respective bolts, and key controlled means operable from the outside of the vehicle for shifting the shiftable member of one of said locks to render the outside retractor of this lock effective to retract the bolt.

19. A locking system for an automotive vehicle having a plurality of doors comprising a lock for each of said doors, each lock having a retractable bolt and inside and outside retractors independently operable to retract said bolt, a shiftable member for each outside retractor for rendering the outside retractor ineffective to retract the bolt, and means including electro-magnetic means for each of said locks for simultaneously shifting each of the shiftable members to render each of the outside retractors ineffective to retract their respective bolts, a switch positioned upon the inside of the vehicle body remote from each of the said locks and electrical connection for co-incidentally controlling all the said electromagnetic means and key controlled means operable from the outside of the vehicle for shifting the shiftable member of one of said locks to render the outside retractor of this lock effective to retract the bolt.

20. A locking system for an automotive vehicle provided with an ignition switch and having a plurality of doors comprising a lock for each of said doors, each lock having a retractable bolt and inside and outside retractors independently operable to retract said bolt, a shiftable member for each outside retractor for rendering the outside retractor ineffective to retract the bolt, and means including electromagnetic means controllable at a remote location upon the automotive vehicle body and controlled by one of the operations involved in operating the ignition switch, for simultaneously shifting a plurality of said shiftable members to render a plurality of said outside retractors ineffective to retract their respective bolts.

FRANCIS D. HARDESTY.